United States Patent Office 3,064,030
Patented Nov. 13, 1962

3,064,030
METHOD OF PREPARING VINYL AND SUBSTITUTED VINYL PHOSPHONATES BY DEHYDROHALOGENATION
David H. Chadwick, Webster Groves, and Charles H. Campbell, Crestwood, Mo., and Sidney H. Metzger, Urbana, Ill., assignors to Monsanto Chemical Company, St. Louis, Mo., a corporation of Delaware
No Drawing. Filed June 18, 1958, Ser. No. 742,734
7 Claims. (Cl. 260—461)

This invention relates to an improved method of dehydrohalogenating dialkyl-, bis(alkylphenyl), diphenyl-, bis(aralkyl), bis(haloalkyl)-, and bis(halophenyl) β-haloalkyl- phosphonates to produce the corresponding vinylphosphonates and substituted vinylphosphonates.

According to this invention there is provided a dehydrohalogenating process which comprises reacting compounds of the structure

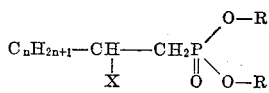

where $n$ has a value from 0 to 4; where X is a member selected from the group consisting of chlorine and bromine; and R is a radical having from 1 to 8 carbon atoms selected from the group consisting of aralkyl, haloalkyl, phenyl, alkyl phenyl, halophenyl and alkyl, with an anhydrous alkali metal salt of carbonic acid or an organic acid selected from the group consisting of lower monobasic and lower dibasic organic acids having from 0 to 4 carbon atoms exclusive of the carboxyl grouping. Specifically the invention lies in the use of certain anhydrous alkali metal salts, and accordingly it will be noted that considerable leeway is permitted with respect to the phosphorus compound which may be dehydrohalogenated. It will be particularly noted that the present invention has general application to all compounds coming within the structure

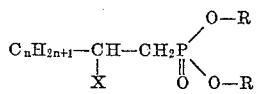

as defined above provided the anhydrous alkali metal salts enumerated below are employed in the reaction. The compounds which are formed may be spoken of as vinyl or substituted vinyl compounds of the general structure

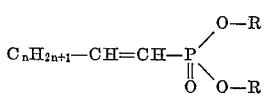

where $n$ and R have the same meaning as above.

By way of a specific example of the above and not by way of limitation, this invention relates to an improved method of dehydrohalogenating bis-(β-chloroethyl) β-chloroethylphosphonate to produce bis-(β-chloroethyl) vinylphosphonate. The latter compound finds use as a film strength additive for engine crank case oils.

It is known in the art that bis-(β-chloroethyl) β-chloroethylphosphonate may be dehydrohalogenated to bis-(β-chloroethyl) vinylphosphonate by means of an alcoholic solution of potassium hydroxide. However, the aforementioned dehydrohalogenation has certain inherent limitations in that upon completion of the process it is necessary to distill off the alcohol solvent to recover the resulting bis-(β-chloroethyl) vinylphosphonate. In addition, the presence of the alcohol increases the bulk of the reactants such that the effective use of any given reaction vessel is materially reduced, a factor which is of considerable importance in the commercial production of bis-(β-chloroethyl) vinylphosphonate. A still more serious limitation in the above process is that the alcohol tends to react with the phosphonate esters of transesterification to form undesirable side products which reduce the overall yield of the desired bis-(β-chloroethyl) vinylphosphonate. In addition the presence of these side products also gives rise to problems with regard to separating the bis-(β-chloroethyl) vinylphosphonate from the side products.

The purpose of this present invention is to avoid the above difficulties and to simplify the overall process whereby the desired products are obtained without being contaminated by the formation and presence of undesirable side products.

In its preferred embodiment this invention has particular application to the dehydrohalogenation of bis(haloalkyl) and dialkyl β-haloalkylphosphonates to form the corresponding bis-(haloalkyl) vinylphosphonates and the dialkyl vinylphosphonates, respectively. Representative of the compounds which may be subject to this process of dehydrohalogenation are bis(β-chloroethyl) β-chloroethylphosphonate, diethyl β-chloroethylphosphonate, dibutyl β-chloroethylphosphonate, dipropyl β-bromoethylphosphonate, diethyl β-chlorohexylphosphonate, bis(β-bromoethyl) β-chlorobutylphosphonate, bis(β - chlorobutyl) β-chloroethylphosphonate, dioctyl-β-chloroethylphosphonate, dioctyl β-chloroamylphosphonate, dihexyl β - bromobutylphosphonate, diamyl β - chloroethylphosphonate, diisohexyl β-chloroethylphosphonate, bis(β-bromohexyl) β-bromopropylphosphonate, bis(β-chlorooctyl) β-bromoethylphosphonate, bis-(β-chlorohexyl) β-chlorobutyl phosphonate, bis(β-chlorohexyl) β-chloroethylphosphonate, and the like.

However, the process of this invention is also applicable to the dehydrohalogenation of bis(arylalkyl) β-haloalkylphosphonates, diphenyl β-haloalkylphosphonates, bis(alkylphenyl) β-haloalkylphosphonates, and bis(halophenyl) β-haloalkylphosphonates. Representative of these compounds are the following: dibenzyl β-chloroethylphosphonate, dibenzyl β-bromobutylphosphonate, dibenzyl β-chloropropylphosphonate, dibenzyl β-chloroamylphosphonate, diphenyl β-bromoethylphosphonate, diphenyl β-chlorobutylphosphonate, diphenyl β-bromopropylphosphonate, diphenyl β-chlorohexylphosphonate, diphenyl β-chloroethylphosphonate, bis(chlorophenyl) β-chloroethylphosphonate, bis(chlorophenyl) β - bromoethylphosphonate, bis(chlorophenyl) β - chloroethylbutylphosphonate, ditolyl β-chloroethylphosphonate, ditolyl β-bromohexylphosphonate, dixylyl β - bromoethylphosphonate, ditolyl β-chlorobutylphosphonate, and the like.

Anhydrous alkaline compounds contemplated by this invention include sodium carbonate, potassium carbonate, sodium formate, sodium propionate, potassium acetate, potassium butyrate, sodium acetate, potassium propionate, sodium butyrate, sodium malonate, potassium succinate, sodium oxalate, sodium adipate, and the like. In general any of the sodium or potassium salts of carbonic acid or the lower monobasic and dibasic organic acids having from 0 to 4 carbon atoms exclusive of the carbon atom or atoms present in the carboxylic radical (monobasic) or radicals (dibasic) may be used in the present invention.

As illustrative of this new process are the following:

*Example 1*

A mixture of 134.8 g. of bis-(β-chloroethyl) β-chloroethylphosphonate (0.5 mol) and 49.2 g. of anhydrous sodium acetate (0.6 mol) was heated at 105–110° C. for five hours. Thereafter it was cooled, washed with three 100 ml. portions of cold water, dehydrated and distilled under reduced pressure to give 56.1 grams of bis-(β-chloroethyl) vinylphosphonate, B.P. 135–6°/2.1 mm.

Example II

The procedure of Example I is repeated except 39.8 g. of anhydrous sodium formate is used instead of sodium acetate and heated at 125° C. for a period of 7 hours to give bis-(β-chloroethyl) vinylphosphonate in good yields.

Example III

A mixture of 269.5 g. (1.0 mol) of bis-(β-chloroethyl) β-chloroethyl phosphonate and 53.0 g. (0.5 mol) of anhydrous sodium carbonate was heated at about 150° C. for 1.5 hours. It was cooled, washed, dehydrated, and distilled as in Example I above to give 155.7 g. (58.2 percent yield) of bis-(β-chloroethyl) vinylphosphonate.

Example IV

The procedure of Example III is repeated except 97.0 g. (0.50 mol) of anhydrous potassium succinate is used instead of the sodium carbonate to give bis-(β-chloroethyl) vinylphosphonate in good yield.

Example V

A mixture of 101.0 g. of diethyl β-chloroethyl phosphonate (0.5 mol) and 49.2 g. of anhydrous sodium acetate (0.6 mol) is heated at 105–110° C. for five hours. Thereafter, the reaction mass is cooled, washed with successive portions of cold water, dehydrated and distilled under reduced pressure to give diethyl vinylphosphonate in good yield, B.P. 65–70° C./3 mm.

Example VI

The procedure of Example V is repeated except 129.0 g. of dibutyl β-chloroethylphosphonate is used and a good yield of dibutyl vinylphosphonate is obtained.

Although the preferred embodiment is to conduct the dehydrohalogenation without a solvent, so as to avoid later distillation thereof, it is to be understood that the reaction will take place in the presence of substantially anhydrous insert organic solvents such as dioxane, hexachloroethane, o-chlorobenzene, dichlorobenzene, dibutyl ether and the like. However, with the present invention the use of solvents does not result in transesterification, as in the case of dehydrohalogenation by means of alcohol and potassium hydroxide referred to above, so as to form undesirable side products with their attendant problems of having to separate these products from the desired product.

It is to be noted that the temperature conditions under which the reaction will take place will depend upon the particular reactants involved. Ordinarily the temperature will range between 105° C. to 160° C. However, temperatures from 80° C. to 175° C. may be employed depending upon the specific reactants used.

Various modifications of the invention as hereinabove set forth may be made without departing from the spirit and scope thereof, and only such limitations should be imposed as indicated in the following claims.

What is claimed is:

1. In a method of dehydrohalogenating a β - haloalkyl phosphonate to form the corresponding vinyl phosphonate, the steps comprising reacting a compound of the structure

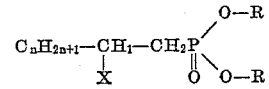

where $n$ is a number having a value from 0 to 4; where X is a member selected from the group consisting of chlorine and bromine and R is a radical selected from the group consisting of aralkyl, haloalkyl, phenyl, alkyl phenyl, halophenyl, and alkyl, said radical having from 1 to 8 carbon atoms, with an anhydrous alkali metal salt of an acid selected from the group consisting of lower monobasic and lower dibasic organic acids having from 1 to 6 carbon atoms in the absence of a solvent.

2. The method of claim 1 in which the reactants are heated at a temperature of about 80° C. to about 175° C.

3. The method of claim 1 in which the anhydrous alkali metal salt is sodium acetate.

4. The method of claim 1 in which the anhydrous alkali metal salt is potassium succinate.

5. The method of claim 1 in which the anhydrous alkali metal salt is sodium formate.

6. In a method of dehydrohalogenating bis-(β-chloroethyl) β-chloroethylphosphonate, the steps comprising reacting bis-(β-chloroethyl) β-chloroethylphosphonate with an anhydrous alkaline salt of an acid selected from the group consisting of lower monobasic and lower dibasic acids which have from 0 to 4 carbon atoms exclusive of the carboxyl grouping, to form bis-(β-chloroethyl) vinylphosphonate in the absence of a solvent.

7. The method of claim 6 in which the salt is anhydrous sodium acetate.

References Cited in the file of this patent

UNITED STATES PATENTS

| | | |
|---|---|---|
| 2,389,576 | Kosolapoff et al. | Nov. 20, 1945 |
| 2,557,805 | Upson | June 19, 1951 |

OTHER REFERENCES

Ford-Moore et al.: "J. Chem. Soc." (1947), pp. 1465–6.

Kosolapoff et al.: "J. Am. Chem. Soc." 73 (1951), p. 855.

Kabachnik: "Chem. Abst.," 42, col. 4132 (1948).

Gefter: "Uspekhi Khim.," 25, No. 2, pp. 162–189 (1956). A.T.S. English Translation RJ–619, p. 3.